(12) United States Patent
Young

(10) Patent No.: US 8,740,096 B2
(45) Date of Patent: Jun. 3, 2014

(54) BARCODED LOTTERY TICKET, SYSTEM AND METHOD FOR PRODUCING AND VALIDATING THE SAME

(75) Inventor: Eric Andrew Young, Toronto (CA)

(73) Assignee: Ontario Lottery and Gaming Corporation, Toronto (CA)

( * ) Notice: Subject to any disclaimer, the term of this patent is extended or adjusted under 35 U.S.C. 154(b) by 137 days.

(21) Appl. No.: 12/962,142

(22) Filed: Dec. 7, 2010

(65) Prior Publication Data

US 2012/0138688 A1    Jun. 7, 2012

(51) Int. Cl.
*G06K 19/06* (2006.01)
(52) U.S. Cl.
USPC .............. 235/494; 235/487; 235/462.01
(58) Field of Classification Search
USPC ............... 235/487, 494, 462.01, 454, 375
See application file for complete search history.

(56) References Cited

U.S. PATENT DOCUMENTS

| | | | | |
|---|---|---|---|---|
| 5,317,135 | A * | 5/1994 | Finocchio | 463/17 |
| 5,791,990 | A * | 8/1998 | Schroeder et al. | 463/17 |
| 5,935,000 | A * | 8/1999 | Sanchez et al. | 463/17 |
| 6,889,214 | B1 * | 5/2005 | Pagel et al. | 705/410 |
| 7,008,318 | B2 * | 3/2006 | Schneier et al. | 463/17 |
| 7,073,720 | B2 * | 7/2006 | Behm et al. | 235/487 |
| 7,252,222 | B2 * | 8/2007 | Finnerty et al. | 235/375 |
| 7,322,529 | B2 * | 1/2008 | Behm et al. | 235/487 |
| 7,353,398 | B2 * | 4/2008 | Kra | 713/181 |
| 7,364,091 | B2 * | 4/2008 | Streeter | 235/494 |
| 7,559,466 | B2 * | 7/2009 | Brookner | 235/382 |
| 7,611,065 | B2 * | 11/2009 | Behm et al. | 235/487 |
| 2002/0188845 | A1 * | 12/2002 | Henderson et al. | 713/168 |
| 2003/0226028 | A1 * | 12/2003 | Kra | 713/200 |
| 2004/0227000 | A1 * | 11/2004 | Behm et al. | 235/487 |
| 2005/0133584 | A1 * | 6/2005 | Finnerty et al. | 235/375 |
| 2005/0256811 | A1 * | 11/2005 | Pagel et al. | 705/401 |
| 2006/0081710 | A1 * | 4/2006 | Streeter | 235/454 |
| 2006/0180673 | A1 * | 8/2006 | Finnerty et al. | 235/491 |
| 2006/0273156 | A1 * | 12/2006 | Berm et al. | 235/380 |
| 2006/0273157 | A1 * | 12/2006 | Behm et al. | 235/380 |
| 2011/0190042 | A1 * | 8/2011 | Connolly et al. | 463/17 |

FOREIGN PATENT DOCUMENTS

CA    2322826 A1    9/1999

* cited by examiner

*Primary Examiner* — Paultep Savusdiphol
(74) *Attorney, Agent, or Firm* — Pearne & Gordon LLP

(57) ABSTRACT

A system and method of providing and validating a bar-code on a lottery ticket to allow secure verification of tickets is described. Lottery ticket information comprising unique identifying information uniquely identifying the lottery ticket and validation information for use in determining a prize value associated with the lottery ticket is generated. First redundancy information is generated using the validation information and a portion of the unique identifying information. The first redundancy information used for checking the integrity of subsequently received validation information. The validation information is encrypted and second redundancy information is generated using the unique identifying information and the encrypted validation information. A first bar-code is constructed using the unique identifying information, the encrypted validation information and the second redundancy information. The first bar-code is printed on the lottery ticket and at least a part of the first bar-code is covered with scratch-off material.

14 Claims, 7 Drawing Sheets

BARCODED LOTTERY TICKET, SYSTEM AND METHOD FOR PRODUCING AND VALIDATING THE SAME

FIELD OF INVENTION

The present invention relates to a lottery system, and in particular, to a bar-coded lottery ticket and a system and method for producing and validating the same.

BACKGROUND

Lottery tickets can be generally divided into instant and on-line lottery tickets. For instant lottery tickets, winning tickets are predetermined, whereas for on-line lottery tickets, winning tickets are unknown until an event, such as a number draw, takes place. The significance of this difference is that for instant lottery tickets, information about the prize is available at the time of printing and the printed ticket includes information that can be connected or related to the prize information. Thus, it is important for the instant lottery ticket and its associated prize information to be secure in order to maintain the integrity of the lottery system.

The security or integrity of a lottery system may be attacked in numerous ways. For example, an external fraudster may attempt to determine and submit winning ticket numbers by repeatedly submitting ticket information that is used to determine and allocate winnings. Such an attack may be referred to as a fishing type of attack as the fraudster is fishing for a valid winning ticket information. This type of attack may be successful if the fraudster guesses a valid winning ticket information. The system is tricked into paying the fraudster for the winning prize, assuming the prize is below a given threshold above which the prize must be redeemed in person; however the fraudster may not have purchased the ticket and has merely guessed the correct ticket information.

An internal fraudster, such as someone having access to internal lottery administration systems, may attempt to determine the location a winning ticket was sent to. The internal fraudster may then attempt to purchase tickets from the determined location, thus increasing the probability of winning. Typically, an internal fraudster will attempt to locate a winning ticket having a large prize in order to make the possibility of purchasing a large amount of tickets worthwhile.

Additionally, the security or integrity of the lottery system may be attacked through the collusion of external and internal fraudsters. Regardless of who is involved in attempting to defraud the lottery system, there are various ways of attacking the lottery system.

Previous attempts at improving the security or integrity of the lottery system have generally focused on preventing external fraudsters from pre-screening tickets for winning tickets or otherwise tampering or defrauding the lottery system.

Traditionally, instant lottery tickets were validated by scanning a validation bar-code at a ticket terminal and the terminal operator manually keyed-in a security code. Because the security code was hidden under a scratch-off material, the player and the lottery administration were given assurance that the vendor did not pre-screen the lottery ticket to pick out the winning tickets. However, the security code was not foolproof as vendors attempted to guess the security code, which may be a 3 or 4 digit number. Moreover, human errors also contributed to errors in the validation process.

Thus, there have been attempts to further streamline the validation process by eliminating the security code and incorporating all the validation information into the bar-code. This allowed the instant lottery ticket to be verified simply by scanning the validation bar-code without manual human input. Security of such bar-codes may be increased by encrypting the bar-code contents.

However, a shortcoming of this solution was that the bar-code contained information a fraudster could use to obtain the prize information. The combination of the lottery ticket information and the security code could jeopardize the integrity of the lottery system.

Therefore, a method of bar-coding lottery information on an instant lottery ticket that increases or ensures the integrity of the lottery system would be desirable.

SUMMARY

In accordance with the present disclosure, there is provided a method of providing a bar-code on a lottery ticket to allow secure verification of tickets, the method comprising generating lottery ticket information comprising unique identifying information uniquely identifying the lottery ticket and validation information for use in determining a prize value associated with the lottery ticket, generating a first redundancy information using the validation information and a portion of the unique identifying information, the first redundancy information for checking the integrity of subsequently received validation information, encrypting the validation information, generating a second redundancy information using the unique identifying information and the encrypted validation information and constructing a first bar-code using the unique identifying information, the encrypted validation information and the second redundancy information, printing the first bar-code on the lottery ticket and covering at least a part of the first bar-code with scratch-off material.

In accordance with the present disclosure, there is further provided a method of verifying a lottery ticket comprising receiving bar-code information scanned from a bar-code printed on the lottery ticket, bar-code comprising unique identifying information for uniquely identifying the lottery ticket and encrypted validation for determining a prize value associated with the lottery ticket, decrypting the validation information, retrieving first redundancy information associated with the lottery ticket, the first redundancy information generated from a portion of the unique identifying information and the encrypted validation information when printing the lottery ticket, generating redundancy information using the portion of the unique identifying information from the received bar-code information and the decrypted validation information, determining if the generated redundancy information matches the retrieved first redundancy information, and determining the prize value associated with the ticket using the decrypted validation information when the generated redundancy information matches the retrieved first redundancy information.

In accordance with the present disclosure, there is further provided a bar-coded instant lottery ticket comprising a substrate having a first side and a second side, a play area on the first side, a first bar-code and scratch-off material covering at least a part of the first bar-code. The first bar-code being constructed comprising unique identifying information for uniquely identifying the lottery ticket, encrypted validation information for use in determining a prize associated with the lottery ticket and first redundancy information generated from a portion of the unique identifying information and the encrypted validation information for use in verifying the lottery ticket.

BRIEF DESCRIPTION OF THE DRAWINGS

These and other features of the invention will become more apparent from the following description in which reference is made to the appended drawings wherein.

DETAILED DESCRIPTION

Figure 1:
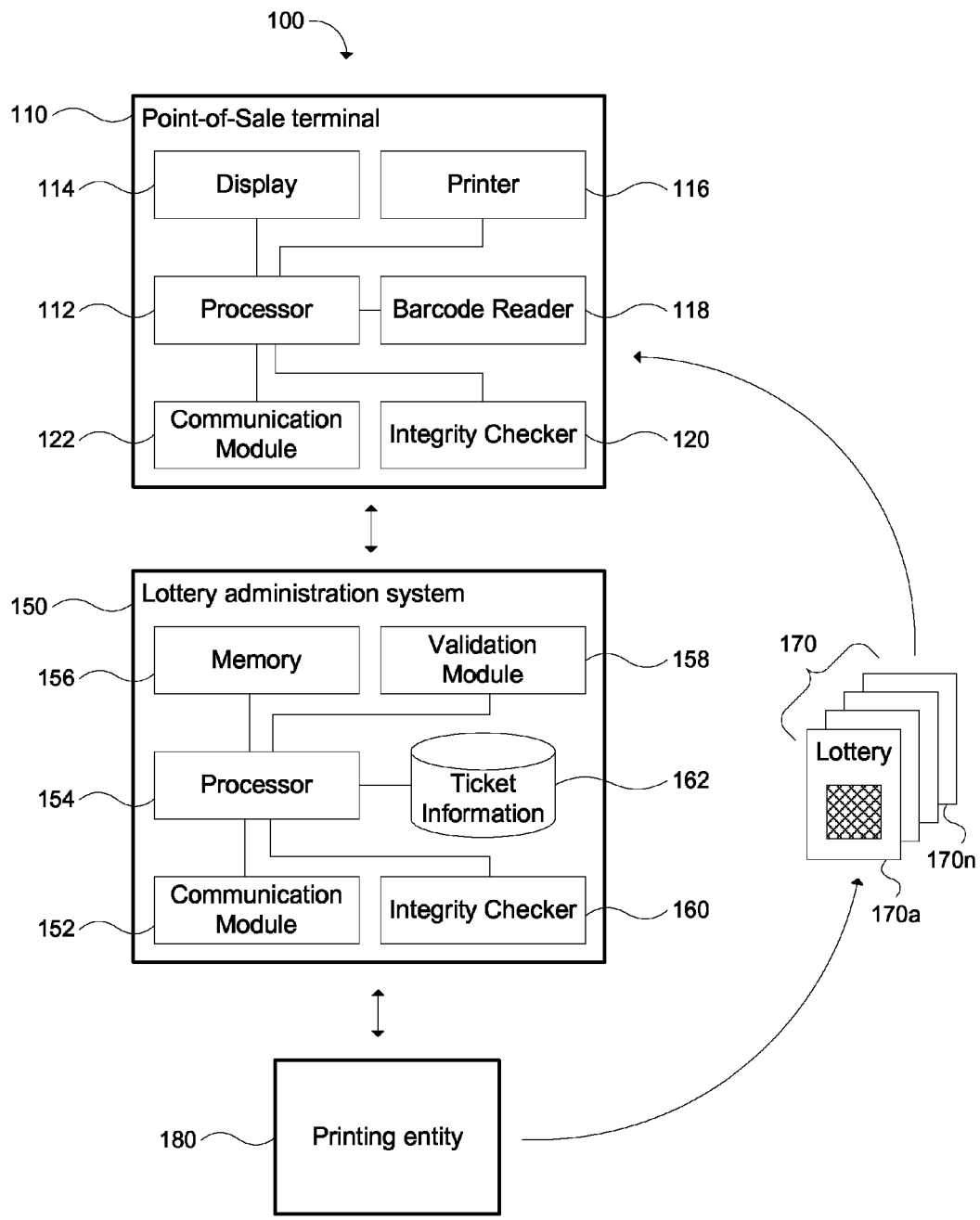
FIG. 1 shows a schematic diagram of a lottery system for use with an embodiment of the present technology.

In this specification and the appended claims, the singular forms "a," ",", and "the" include plural references unless the context clearly dictates otherwise. Unless defined otherwise, all technical and scientific terms used herein have the same meaning as commonly understood to one of ordinary skill in the art to which this technology belongs.

It will be further understood that the terms "comprises" or "comprising", or both when used in this specification, specify the presence of stated features, integers, steps, operations, elements, and/or components, but do not preclude the presence or addition of one or more other features, integers, steps, operations, elements, components, and/or groups thereof.

Instant lottery tickets are generally grouped into different 'games'. Each game may comprise a number of tickets having the same rules and game play. The tickets of each game are typically printed under a contract between a lottery administration and a ticket printing entity. For each game the lottery administration may communicate an encrypt pass-phrase and salt to the printer. The encrypt pass-phrase and salt is used by the printer to encrypt individual validation information associated with respective tickets. For each print run, or game, the printer generates ticket information, including which particular tickets win and the unique id's of the tickets. The unique id's of the tickets generally follow a format agreed upon by both the lottery administration and the printer. Information used for determining if a particular ticket is a winner is, put in a bar-code(s) printed on the ticket. The information included in the bar-code may be determined as described further herein. Once the printer has printed the tickets, they are sent from the printer for distribution, for example they may be sent to a distribution warehouse of the lottery administration. The printer has information on which specific tickets are associated with winning prizes, but doesn't know the location the winning tickets will be distributed to but rather only numbers, or other identifiers, that can be later associated with the locations. In addition to sending the printed tickets for distribution, the printer also sends the ticket information specifying winning verification information back to the lottery administration. The lottery administration may then associate each printed ticket, or groups of printed tickets, or more particularly identifiers representing the tickets or groups of tickets, with a specific retail location. The tickets are then shipped to the appropriate locations, The ticket information, specifying winning tickets is also stored by the lottery administration computer systems for subsequent checking/validating of winning tickets. It is desirable to limit the number of people that can determine both what tickets are associated with winning prizes and where the tickets are shipped to.

As set forth further below, by providing a bar-code on the ticket that includes an encrypted version of the verification information that can be associated with redundancy information generated from a combination of the verification information and a portion or subset of the unique identifier of each ticket, it is possible to prevent people at the lottery administration from determining if tickets shipped to a particular location include any winning tickets. Furthermore, it is possible to verify that scanned encrypted verification information is associated with a ticket, or group of tickets since as described further herein the redundancy information may be generated from a portion of the unique identifying information. As such, the lottery administration may be assured that verification information was associated with a printed ticket or group of printed tickets. It is more difficult for a fraudster to guess at winning verification information. Further still, the inclusion of the encrypted verification information allows a customer to scan a ticket at a self-serve kiosk or terminal to verify that a ticket is a winning ticket.

FIG. 1 is a schematic depiction of a lottery system 100 for use with the present technology. FIG. 1 has been intentionally simplified to show only certain main components. The lottery system 100 may include other components beyond what is illustrated in FIG. 1.

As shown in FIG. 1, the lottery system 100 includes a point-of-sale terminal 110, a lottery administration system 150, and a printing entity 180. The point-of-sale terminal 110 would typically be located in a retail location and can be used to sell tickets and check tickets to see if a ticket is a winner. The lottery administration system 150 may determine if a ticket being checked is a winner. The printing entity 180 is responsible for generating and printing the tickets 170a . . . 170n (referred to collectively as tickets 170). The administration system 150 and printing entity 180 may communicate with each other in order to transfer ticket information, including information regarding winning tickets. For example, the printing entity 180 may store information on each ticket printed, including a unique identifier and associated prize information, and send the ticket information to the lottery administration 150. The point-of-sale terminal 110 may communicate with the administration system 150 in order to check tickets against the ticket information to determine winners and associated prizes.

The point-of sale terminal 110 may be used by a retailer in connection with selling tickets, or may be a stand-alone ticket verifying device that can be used by a consumer to verify winning tickets. The point-of-sale terminal 110 may include a processor 112, a display 114 and a printer 116. The display 114 may be used to communicate to a lottery player if the ticket is a winner and the associated winning prize. The display 114 may also be used for other purposes such as promotional ads. The printer 116 may be used to print lottery tickets (e.g. on-line lottery tickets) or receipts or both for the player. The point-of-sale terminal may further include a bar-code reader 118 for scanning validation bar-codes. The point-of-sale terminal may also include an integrity checker 120 for verifying the integrity of the scanned information from bar-codes. This integrity check may be based on redundancy information included in a bar-code of the lottery ticket as described further herein. The integrity check at the point-of-sale terminal does not need to be performed on all scanned bar-codes. For example, if scanned bar-code information is sent to the lottery administration system for further processing, it may not be necessary to check the integrity at the point-of-sale terminal.

To validate a ticket, the point-of-sale terminal 110 communicates the scanned bar-code information, or portion thereof, with the lottery administration system 150 using the communication module 122. The communication module 122 may utilize wired or wireless communication technologies for communication with the lottery administration system 150. The lottery administration system 150 communicates the prize associated with the scanned bar-code information back to the point-of-sale terminal 110, which is then communicated to the player.

The lottery administration system 150 includes a communication module 152 for communicating with the point-of-sale terminal 110. The lottery administration system 150 may further include a processor 154, memory 156, a validation module 158, and integrity checker 160 and a ticket information database 162 or similar data store. The validation module 158 is used by the processor 154 to validate a ticket 170 that has been scanned to determine whether or not the ticket is a winner using the ticket information stored in the ticket information database 162. The integrity checker 160 in the lottery server 150 verifies the integrity of the decrypted scanned information received from the point-of-sale terminal 110. Although the lottery administration system 150 is depicted as a single component, it could comprise a plurality of physically or logically separate computers that are configured to provide the same functionality as described.

The lottery system 100 may further include a printing entity 180 for printing the lottery tickets 170. The lottery administration system 150 may communicate all necessary information for creating the lottery tickets by the printing entity 180. The printing entity 180 generates or retrieves printing information, for example a unique ticket identifier, a prize of the ticket, and validation information for associating the prize with the unique ticket. The unique ticket identifier may be used by the lottery administration to specify or associate the delivery location of groups, packages or books of tickets that are to be sold. The unique identifier, or a portion thereof, may also be used for inventory management purposes. The validation information may be unique to each printed ticket and may be used to determine a prize associated with a ticket. The prize may be a cash value or some other consideration. The printing entity prints the physical tickets 170, including one or more covered bar-codes as described further herein. The printing entity 180 also generates ticket information including the validation information as well as redundancy information generated from at least a portion of the unique ticket identifier for each of the tickets printed. This validation information is provided to the lottery administration system 150, which is subsequently used for validating winning tickets. The validation information is associated with the ticket it was printed on through the redundancy information as described further herein. As such, the redundancy information may also be sent to the lottery administration from the printer. While the printing entity 180 is shown as a separate entity in FIG. 1, it will be understood that the printing entity 180 may be part of the lottery administration system 150.

After receiving the ticket information, the lottery administration may store the information in a ticket information database 162. The lottery administration may then assign printed tickets to different sales locations based on the unique identifier, which has a format agreed upon by both the printing entity and the lottery administration.

A fraudster internal to the printing entity 180 may be able to determine winning tickets based on the ticket information; however, the fraudster would not know the location that the tickets will be delivered to, and as such, cannot readily make use of the information to defraud the lottery system. Similarly, a fraudster internal to the lottery administration may be able to determine the location a specific ticket, group, package or book of tickets is sent to; however they are unable to easily determine if any of the tickets are winners.

The unique identifier for each ticket follows a format agreed upon by both the lottery administration and the printer. It may be composed of different components. For example, the unique identifier may include a package identifier that specifies a particular package, which may be for example a group of 100 tickets, as well as a sequence number, for example 1-100 identifying each ticket within the package. The unique identifier may also include additional identifiers such as a game type identifier, a game identifier, a batch number identifying the particular printing run of the tickets or other information may also be included. The lottery administration may specify the location to send tickets based on a subset of the unique identifier, such as for example the package information.

Figure 2:
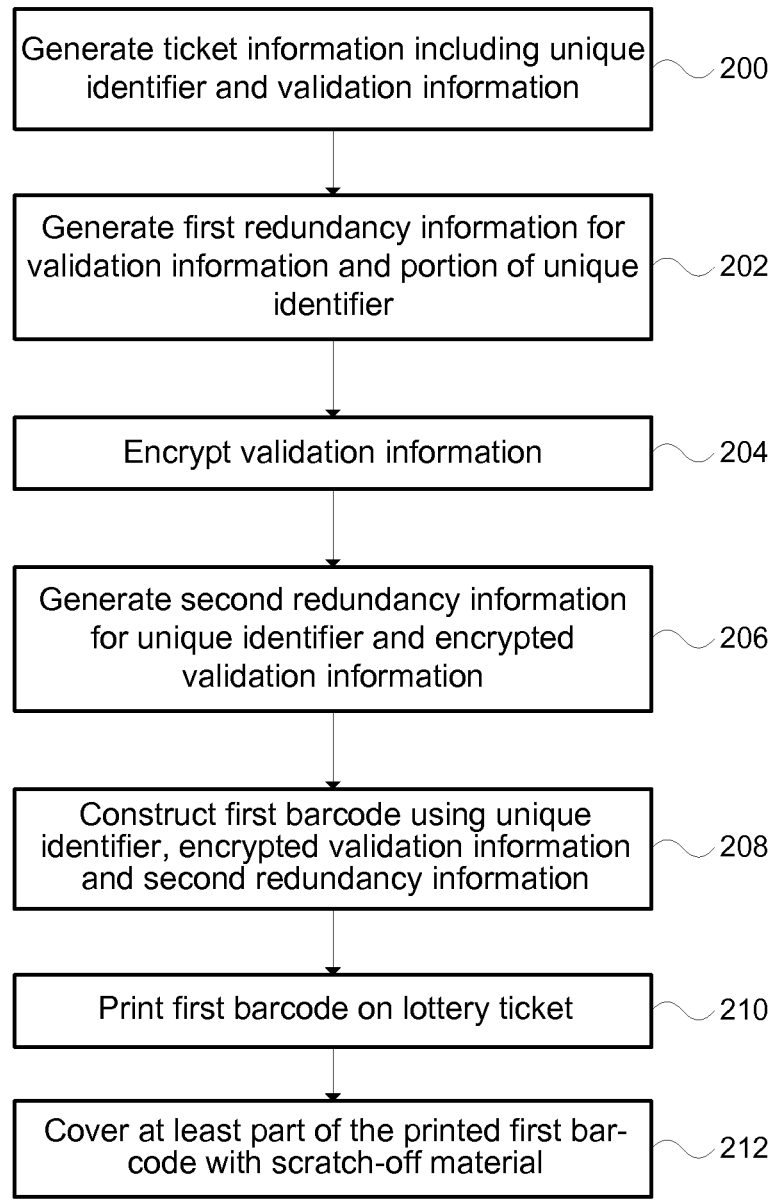
FIG. 2 shows a flow chart of a method for bar-coding lottery ticket information according to an embodiment of the present technology.

Now referring to FIG. 2, a method for bar-coding lottery information according to an embodiment of the present technology is shown. At step 200, lottery ticket information, comprising a unique identifier which may include game information and inventory information, and validation information is generated or retrieved. The game information may be used to identify the type of lottery game with which the lottery ticket is associated. Depending on the lottery administration, the game identifier may be unique to each print run of a particular type of tickets. Because there may be many different types of lottery games that may use this bar-coding technology, game information may also include a game type identifier that can be used to identify the game. The unique identifying information, or the inventory information of the unique identifying information, may be used to identify the lottery ticket among the printed lottery tickets. For example, the printing entity 180 may produce thousands of instant lottery tickets that are packaged into cartons for shipment to different locations for sale. The unique identifying information, or the inventory information identifies each lottery ticket among the produced tickets. The unique identifying information, or more particularly a subset of the unique identifying information may also be used to identify the location that a particular ticket is shipped to. The unique identifying information may further be used for inventory management throughout the supply chain and so should be included in some manner, such as in a bar-code as described further herein, on the printed ticket.

The validation information contains information related to the prize of the ticket such as the value of the prize. The validation information may directly specify the prize, or alternatively, the validation information may be used to associate prize information with the ticket. For example, the validation information may be a pointer or index used to retrieve a particular prize record that specifies the actual prize associated with the ticket. Regardless of the particulars of how the validation information represents a prize, the validation information associates a prize with the ticket. It should be noted, that each ticket may have validation information associating a prize with the ticket, even if the ticket does not win. In such a case the prize associated with the ticket through the validation information may indicate that there is no prize, or the value of the associated prize is zero.

As described above, if a person has access to both the unique identifying information, which can be used to determine the location the ticket will be sold, and the validation information, which can be used to determine a prize associated with a ticket, it is possible to determine the location that winning tickets have been shipped to, and so increase the probability of purchasing a winning ticket by purchasing tickets from the location.

After generating or retrieving the ticket information, first redundancy information is generated using only a portion of the unique identifier, for example the game information or the package information, and the validation information (202). The first redundancy information may be used to verify that scanned bar-code information that is being submitted for validating corresponds to actual tickets that were printed. Without the first redundancy information, the validation information could be provided for validating with fraudulent information in place of the portion of the unique identifier actually associated with the printed ticket. This could allow determining a winning validation information independent of knowing the ticket or group of tickets the validation information was printed on, which is undesirable.

The first redundancy information may be generated using a non-cryptographic or cryptographic hash function such as cyclic redundancy check (CRC), message-digest algorithm 5 (MD5) or secure hash algorithm (SHA). In one embodiment of the present technology, the first redundancy information is included in the ticket information sent from the printing entity to the lottery administration, and may be stored in the ticket information database 162 of the lottery administration system 150. The first redundancy information may be used in checking the integrity of received information when validating a ticket. In another embodiment of the present technology, the first redundancy information may be included in the a first bar-code of the lottery ticket.

The validation information is encrypted (204) using an encryption algorithm such as symmetric-key encryption algorithm or public key encryption algorithm. The key or keys used for the encryption may be agreed upon by both the printing entity and the lottery administration prior to printing tickets, or may be communicated in some other manner, such as by telephone, email, or other communication means. An example symmetric-key encryption algorithm is the data encryption standard (DES) or the advanced encryption standard (AES). An example public key encryption algorithm is Rivest, Shamir and Adleman (RSA). Specific details of the encryption including, the key exchange, the use of cryptographic salts and other information is not described further herein, as one skilled in the art of cryptographic systems will appreciate the design options available.

Following encryption of the validation information, a second redundancy information is generated using the unique identifier information and the encrypted validation information (206). Similarly to the first redundancy information, the second redundancy information may be generated using a non-cryptographic or cryptographic hash function such as cyclic redundancy check (CRC), message-digest algorithm 5 (MD5) or secure hash algorithm (SHA). The second redundancy information may be used to ensure, with a degree of confidence, that the information printed on the ticket, which includes the unique identifying information and the encrypted validation information, has not been tampered with and matches the information originally printed on the ticket.

At step 208, the a first bar-code is constructed using the unique identifying information, the encrypted validation information and the second redundancy information. As described above, second redundancy information in the first bar-code can be used to check the integrity of the other information of the bar-code, namely the unique identifying information, which may include game information and, inventory information, and the encrypted validation information.

The first bar-code includes the unique identifying information which may be used for inventory management. However, it is noted that the validation information, which indicates whether the ticket is a winner, is encrypted and so cannot be used to determine if the ticket is a winner without first decrypting the encrypted validation information. Thus, it is not possible for retailers, or purchasers to pre-screen tickets in order to identify winning tickets without acquiring information that may only be available at the lottery administration system 150 to decrypt the validation information. Additionally, as described further, by covering the first bar-code with a scratch off material customers may be further assured that the ticket hasn't been pre-screened or otherwise tampered with.

Alternatively, the first bar-code may also include the first redundancy information, which was generated, for example using a has function, from a portion of the unique identifying information and the un-encrypted validation information. The first bar-code may be constructed using different bar-code techniques. Due to the amount of information of the first bar code, a two-dimensional symbology, such as Datamatrix or PDF417, may typically be used.

The first bar-code is then printed on the lottery ticket (210). In order to provide a visual indication to consumers that the ticket has not been tampered with or pre-screen, the first bar-code may be at least partially covered with scratch-off material (212). The partially covered bar-code prevents the first bar-code from being successfully scanned without first removing some of the material. The scratch-off material may be any material that may be taken off by abrasion such as latex. Where the first bar-code is only partially covered with scratch-off material, it will be understood by the person skilled in the art that the minimum amount of scratch-off material required is dependent on the level of redundancy and error correction capabilities of the barcode technique used. This ensures that the first bar-code cannot be successfully scanned without removing the scratch-off material, and as such allows a purchaser of the lottery ticket to quickly identify tickets that may have been tampered with. At least partially covering the first bar-code provides a further layer of security to the lottery system.

When the first bar-code is scanned, it is possible to retrieve the unique identifying information, which may be used for inventory management, as well as the encrypted validation information, which can be used to validate the ticket. Also it is possible, through the second redundancy information included in the bar-code, to check the integrity of the retrieved information and ensure it matches the information as printed. This integrity check may be done, for example, by the lottery administration system 150.

If the first bar-code is covered, or partially covered, by scratch off material, it is not possible to obtain the unique identifying information for use in inventory management without first scratching of the first bar-code area, which would result in a tampered-with ticket. As described further below, the printing entity 180 may add a second bar-code that includes the unique identifying information that can be used for inventory management to the ticket. The second bar-code would not be covered with scratch off material and so could be used throughout the supply chain for inventory management. As described further below with reference to FIG. 3, the second bar-code may include third redundancy information to ensure that the information retrieved from the second bar-code matches the information as printed.

Figure 3:
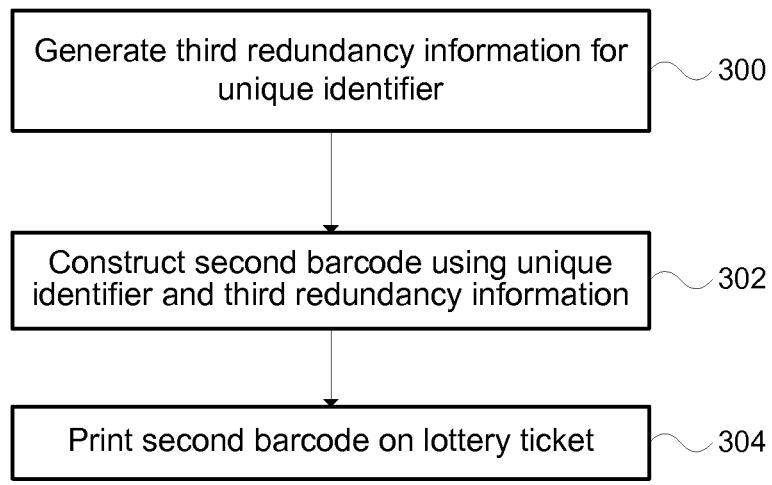
FIG. 3 shows a flow chart of an optional method for bar-coding additional lottery ticket information, according to an embodiment of the present technology.

Referring to FIG. 3, a third redundancy information may be generated using unique identifying information that can be used for inventory management (300). Similarly to the first and second redundancy information, the third redundancy information may be generated using a non-cryptographic or cryptographic hash function such as cyclic redundancy check (CRC), message-digest algorithm 5 (MD5) or secure hash algorithm (SHA).

At step 302, a second bar-code is constructed using the unique identifying information which may include game information and, inventory information, and the third redundancy information. The third redundancy information may be used to check the integrity of the unique identifying information, which may comprise game and inventory information, retrieved from the second bar-code. Similarly to the first bar-code, the second bar-code may be constructed using an appropriate bar-code symbology. For example, a two-dimensional symbology, such as Datamatrix or PDF417, may be used. The second bar-code is then printed on the lottery ticket (304) a. While the first bar-code was described as including the second redundancy and optionally the first redundancy, it is also contemplated that the first bar-code may also include the third redundancy information.

In FIGS. 2 and 3, steps 210, 212, and 304 disclose printing first and second bar-codes on the lottery ticket and covering at least part of the first bar-code with scratch-off material. These steps are carried out by the printing entity 180, which may be internal or external to the lottery administration system 150. The bar codes may be located on the same side, or different sides, of the ticket.

Once the printing entity 180 has printed all of the tickets 170 they may be packaged and sent for distribution. However, the particular destination of different groups or packages of tickets has not been determined. The printing entity sends the ticket information to the lottery administration. The ticket information includes the validation information and associated first redundancy information. The ticket information may also specify the actual prize associated with each individual validation information. The first redundancy information associates a particular validation information with a group of tickets and so validation information can not be successfully validated without knowing the portion of the unique identifying information used to generate the first redundancy information. The lottery administration associates a particular destination with each group or package of tickets, which is possible since the format of the unique identifying information of each ticket is known to both the printing entity 180 and the lottery administration. However, the association between a winning ticket, which can be determined from the validation information, and the location the ticket is sent to can not be determined by a fraudster at the lottery administration since the ticket information, which includes the validation information, does not include the unique identifying information but only includes a portion of it in the redundancy information hash. As a result, it is not possible for a fraudster at either the printing entity or the lottery administration to defraud the lottery system.

Figure 4A:
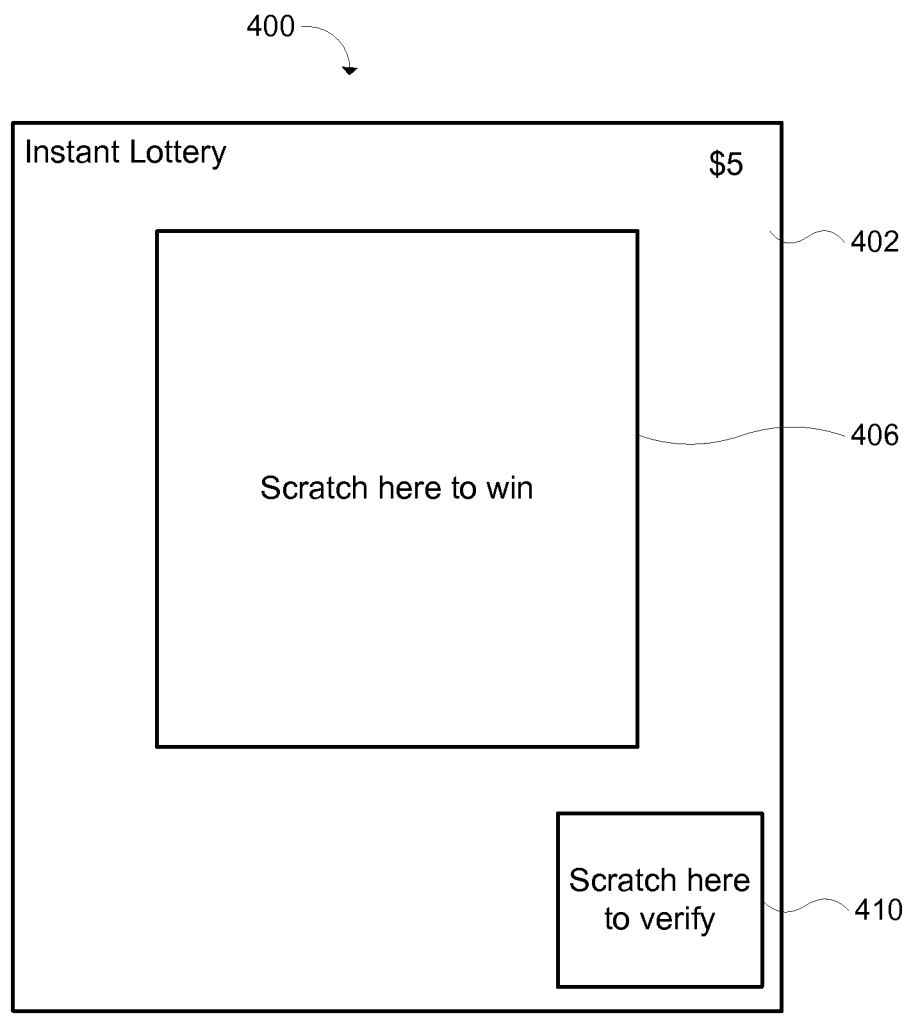
FIG. 4A shows a first side of a bar-coded lottery ticket according to an embodiment of the present technology with scratch-off material present.
Figure 4B:
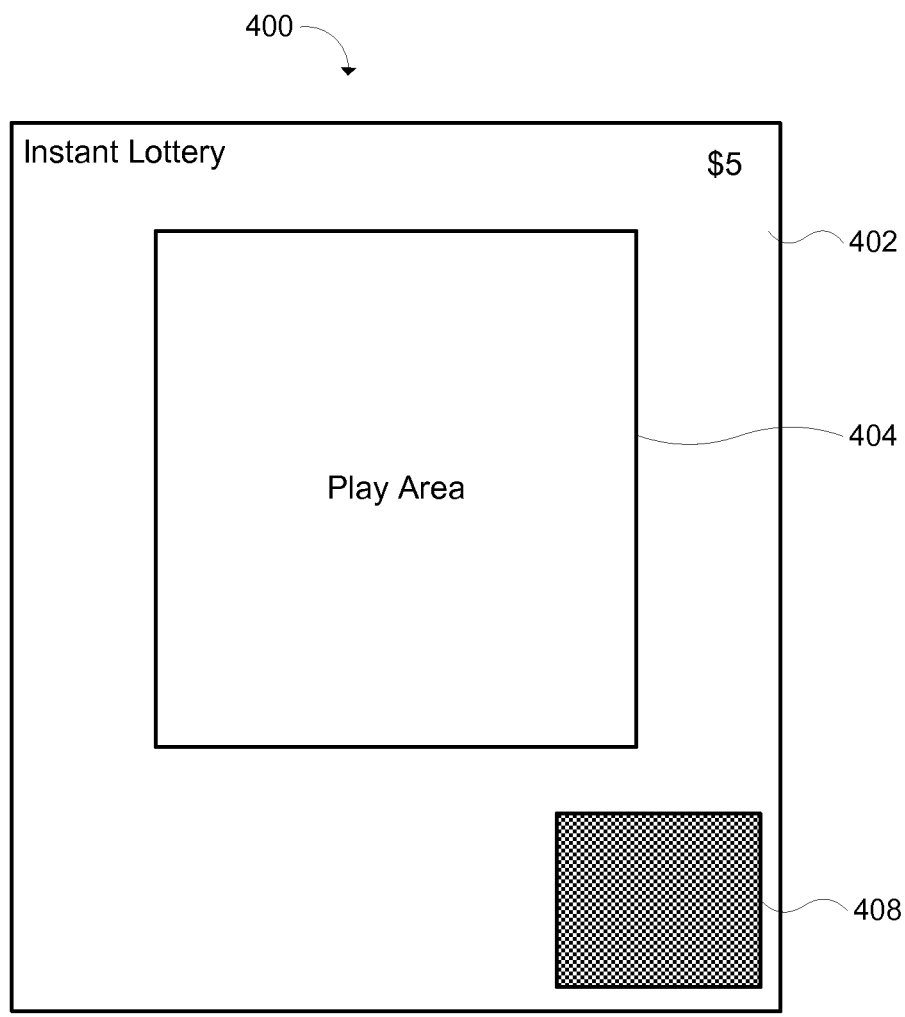
FIG. 4B shows the first side of the bar-coded lottery ticket of FIG. 4A with the scratch-off material removed.
Figure 4C:
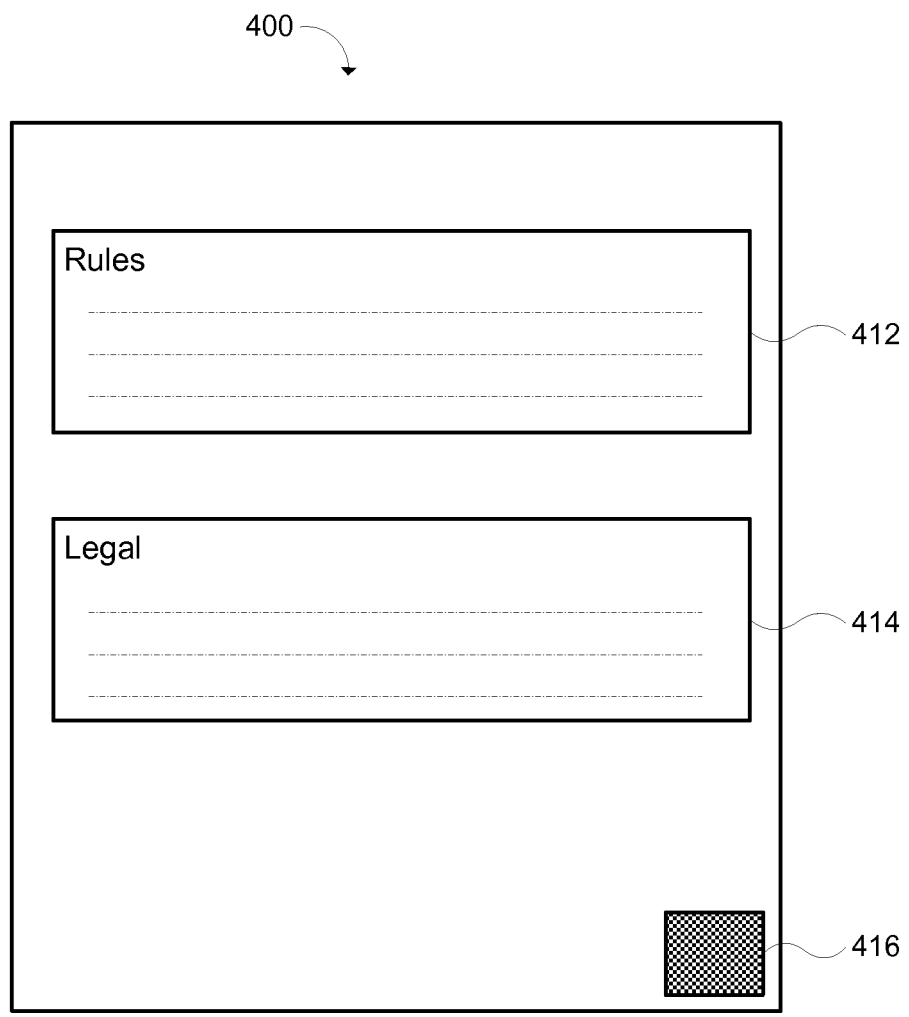
FIG. 4C shows the second side of the bar-coded lottery ticket of FIG. 4A.

In FIGS. 4A-4C, there is illustrated a bar-coded lottery ticket according to an embodiment of the present technology. The lottery ticket 400 is made of a substrate 402 having a first side and a second side. On the first side, there is a play area 404 covered by scratch-off material 406 embodying text such as "SCRATCH HERE TO WIN $$$" as shown in FIG. 4A. The lottery ticket 400 further includes a first bar-code 408 covered by scratch-off material 410. In this particular embodiment, the first bar-code 408 is shown on the first side of the substrate 402 but it is contemplated that the first bar-code 408 may be on the first or second side. Moreover, while both the play area 404 and the first bar-code 408 are shown fully covered with scratch-off material, it is contemplated that the play area 404 and first bar-code 408 may be partially covered by scratch-off material.

On the second side of the lottery ticket 400, rules of the game 412 and legal information 414 may be included. In this particular embodiment of the lottery ticket 400, there is included a second bar-code 416 constructed using unique identifying information, which may comprise game information and inventory information, and third redundancy information used for checking the integrity of the bar-code information when scanned. The second bar-code 416 is may be used to manage inventory levels and it does not contain any validation information. The second bar-code may be omitted from the ticket. If the second bar-code is omitted from the ticket, the information used for inventory management should be included on the ticket in another fashion, since the obtaining the information from the first bar-code would require scratching off the first bar-code location, which would result in a consumer believing the ticket had been tampered with.

Additionally, a third bar-code may be included on the lottery ticket. The third bar-code is substantially similar to the first bar-code and can be used to validate a ticket. The third bar-code may be used as a back-up bar-code in case the first bar-code cannot be used, or its integrity cannot be verified. Since the third bar-code contains the same information as the first bar-code, it should also be covered, or partially covered, with scratch off material. A convenient location for the third bar-code may be within the play area which is typically covered by scratch of material.

The details and particulars of the use operation of the bar-coded lottery ticket 400 to distribute and verify winning tickets will now be described with reference to the attached drawings. The following description assumes that the first bar-code is covered with scratch off material.

When the ticket is being delivered to the retail location, the second bar code that is not covered with scratch off material may be scanned to obtain the unique identifying information, including inventory management information. The integrity of the information of the second bar-code may be checked using the third redundancy information included in the second bar-code. The integrity may be checked by recreating the third redundancy information from the scanned information and checking to see if the recreated third, redundancy information matches the original third redundancy information. When a customer purchases a lottery ticket 400, the customer is initially assured that the lottery ticket 400 has not been pre-screened, or otherwise tampered with, since doing so would require the vendor removing the scratch-off material 410 on the first bar-code 408. The second barcode 416 does not include validation information and thus, prescreening of the lottery ticket 400 is not possible through the second bar-code 416. If the first bar-code has been scratched off, the customer may wish to decline the lottery ticket 400 as being tampered with.

After purchase, the customer scratches the scratch-off material 406 covering the play area 404. In conjunction with the rules 412, the customer would be able to determine the winning prize. To validate the ticket, the vendor or the customer removes the scratch-off material 410 covering the first bar-code 408. The first bar-code 408 is then scanned into the point-of-sale terminal 110, or a similar device for scanning tickets to be verified, using the bar-code reader 118 and sent to the lottery administration system 150. The integrity of the scanned information may be checked at the point-of-sale terminal using the second redundancy information of the first bar-code. However the scanned information may typically be sent to the lottery administration for further processing such as verifying an associated prize. As such, the integrity may be checked at the lottery administration system and so does not need to be checked at the point-of-sale terminal.

Figure 5:
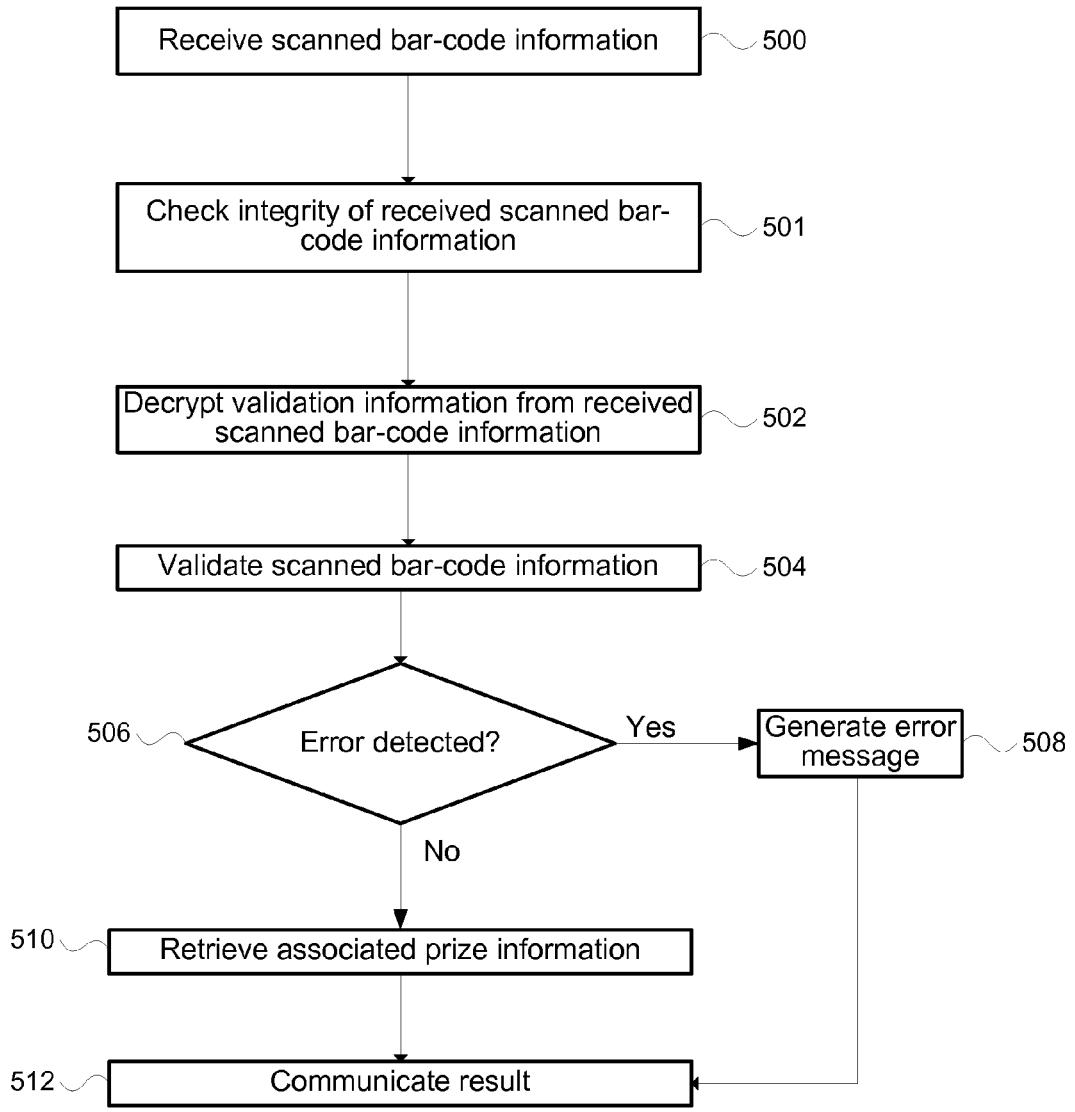
FIG. 5 shows a flow chart of the lottery ticket validation process at a lottery administration system.

Now turning to FIG. 5, detailed operation of the lottery administration system 150 will now be described with regards to validating a ticket. At step 500, the lottery administration system 150 receives the scanned first bar-code information, including the second redundancy information, from the point-of-sale terminal 110. The integrity of the received scanned bar-code information may be verified using the second redundancy information (501). If available, the third redundancy information may also be used to further verify the received scanned bar-code information. The integrity may be checked by recreating the redundancy information from the scanned information and checking to see if it matches the original redundancy information. Once the integrity of the scanned information is verified, the scanned first bar-code information, or more particularly the encrypted validation information of the scanned bar-code information, is then decrypted (502) by the processor 154. The decrypted validation information is used to retrieve from the ticket information database 162 ticket information associated with the particular ticket. The decrypted validation information may be checked against the validation information sent from the printing entity and stored in the database 162 in order to retrieve the ticket information. The first redundancy information associated with the validation information is retrieved and the ticket is validated in order to determine a prize associated with the ticket. The validation may be similar to the integrity check. The ticket may be verified by re-creating the first redundancy information from the scanned bar-code information and checking the re-created first redundancy information to ensure it matches the stored first redundancy information (504). Alternatively if the first redundancy information is part of the scanned information, that is if it was embedded in the first bar-code 408, the integrity of the scanned information may be checked without retrieving the first redundancy information from the database 162.

The first redundancy information provides integrity for the decrypted bar-code information and provides additional security. The first redundancy information ensures that the validation information submitted for validation was associated with a ticket or group of tickets, namely the tickets having the same portion of the unique identifying information used to generate the first redundancy information. That is, the first redundancy information also ensures that the bar-code information submitted for verifying includes the encrypted validation information as well as the portion of the unique identifying information associated with the validation information as printed. As such, a fraudster is unable to successfully verify encrypted validation information without including a portion of the unique identifying information of the ticket the validation information was associated with, thus reducing the possibility of defrauding the lottery system.

Using the first redundancy information, the lottery administration system 150 determines if an error is detected (506), that is, the regenerated first redundancy information does not match the original. If an error is detected, an error message may be generated (508). The error message may be communicated to the point-of-sale terminal 110 (512) or may be stored in memory 156. Other means of error tracking known to the person skilled in the art may be employed.

If no error is detected, the decrypted validation information is used to determine the prize associated with the validation information by the validation module 158 at step 510 and the result of the validation, for example the value of the associated prize, is communicated to the point-of-sale terminal 110 using the communication module 152 at step 512, and the ticket may be redeemed for the prize, assuming the associated prize is below a threshold that can be instantly paid by the retailer.

While the patent disclosure is described in conjunction with the specific embodiments, it will be understood that it is not intended to limit the patent disclosure to the described embodiments. On the contrary, it is intended to cover alternatives, modifications, and equivalents as may be included within the scope of the patent disclosure as defined by the appended claims. In the above description, numerous specific details are set forth in order to provide a thorough understanding of the apparatuses, systems and methods, which may be practiced without some or all of these specific details. In other instances, well-known process operations or details have not been described in-depth in order not to unnecessarily obscure the present patent disclosure.

While the present technology has been described in terms of specific implementations and configurations, further modifications, variations, modifications and refinements may be made without departing from the inventive concepts presented herein. The scope of the exclusive right sought by the Applicant(s) is therefore intended to be limited solely by the appended claims.

What is claimed is:

1. A method of providing a bar-code on a lottery ticket, the method comprising:
   generating lottery ticket information comprising unique identifying information uniquely identifying the lottery ticket and validation information for use in determining a prize value associated with the lottery ticket;
   generating a first redundancy information using the validation information and a portion of the unique identifying information, the first redundancy information for checking the integrity of subsequently received validation information and ensuring that validation information submitted for verifying was associated with a ticket when printed;
   encrypting the validation information;
   generating a second redundancy information using the unique identifying information and the encrypted validation information; and
   constructing a first bar-code using the unique identifying information, the encrypted validation information and the second redundancy information;
   printing the first bar-code on the lottery ticket; and
   covering at least a part of the first bar-code with scratch-off material.

2. The method according to claim 1, further comprising storing the first redundancy information at a server.

3. The method according to claim 1, wherein constructing the first bar-code further comprises including the first redundancy information.

4. The method according to claim 1, further comprising:
   generating a third redundancy information using the unique identifying information;
   constructing a second bar-code using the unique identifying information and the third redundancy information; and
   printing the second bar-code on the lottery ticket.

5. The method according to claim 4, wherein constructing the first bar-code further comprises including the third redundancy information.

6. The method according to claim 4, wherein the third redundancy information is generated using one or more of:
a non-cryptographic hash function; and
a cryptographic hash function.

7. The method according to claim 1, wherein the validation information is encrypted using one or more of:
a symmetric-key encryption algorithm; and
a public key encryption algorithm.

8. The method according to claim 1, wherein the first redundancy information is generated using one or more of:
a non-cryptographic hash function; and
a cryptographic hash function.

9. The method according to claim 1, wherein the second redundancy information is generated using one or more of:
a non-cryptographic hash function; and
a cryptographic hash function.

10. A method of verifying a lottery ticket comprising:
receiving bar-code information scanned from a bar-code printed on the lottery ticket, the bar-code comprising unique identifying information for uniquely identifying the lottery ticket and encrypted validation information for determining a prize value associated with the lottery ticket;
decrypting the encrypted validation information;
retrieving from a data store first redundancy information associated with the lottery ticket, the first redundancy information generated from a portion of the unique identifying information and the encrypted validation information when printing the lottery ticket;
generating redundancy information using the portion of the unique identifying information from the received bar-code information and the decrypted validation information;
determining if the generated redundancy information matches the retrieved first redundancy information; and
determining the prize value associated with the ticket using the decrypted validation information when the generated redundancy information matches the retrieved first redundancy information.

11. A bar-coded instant lottery ticket comprising:
a substrate having a first side and a second side;
a play area on the first side;
a first bar-code comprising:
  unique identifying information for uniquely identifying the lottery ticket;
  encrypted validation information for use in determining a prize associated with the lottery ticket;
  first redundancy information generated using unencrypted validation information and a portion of the unique identifying information; and
  second redundancy information generated from a portion of the unique identifying information and the encrypted validation information for use in verifying the lottery ticket; and
scratch-off material covering at least a part of the first bar-code.

12. The bar-coded instant lottery ticket of claim 11, further comprising a second bar-code comprising:
the unique identifying information; and
third redundancy information generated using the unique identifying information.

13. The bar-coded instant lottery ticket of claim 12, wherein the first bar-code further includes the third redundancy information.

14. The bar-code instant lottery ticket of claim 11, further comprising a third bar-code corresponding to the first bar-code, the third bar-code located under scratch-off material covering at least a part of the play area.

* * * * *

UNITED STATES PATENT AND TRADEMARK OFFICE
CERTIFICATE OF CORRECTION

| | | |
|---|---|---|
| PATENT NO. | : 8,740,096 B2 | Page 1 of 1 |
| APPLICATION NO. | : 12/962142 | |
| DATED | : June 3, 2014 | |
| INVENTOR(S) | : Eric Andrew Young | |

It is certified that error appears in the above-identified patent and that said Letters Patent is hereby corrected as shown below:

On the title page, item [30], insert the following paragraph:

--Priority Data: 2724047 CANADA December 6, 2010--

Signed and Sealed this
Ninth Day of September, 2014

Michelle K. Lee
*Deputy Director of the United States Patent and Trademark Office*